US009554683B2

(12) United States Patent
Fellhauer et al.

(10) Patent No.: US 9,554,683 B2
(45) Date of Patent: Jan. 31, 2017

(54) DUAL DRIVE FLOOR SCRUBBER

(71) Applicant: NSS Enterprises, Inc., Toledo, OH (US)

(72) Inventors: Jeffery R. Fellhauer, Toledo, OH (US); William E. Brashear, Jr., Maumee, OH (US); Dale A. Krausnick, Perrysburg, OH (US)

(73) Assignee: NSS Enterprises, Inc., Toledo, OH (US)

( * ) Notice: Subject to any disclaimer, the term of this patent is extended or adjusted under 35 U.S.C. 154(b) by 681 days.

(21) Appl. No.: 13/874,581

(22) Filed: May 1, 2013

(65) Prior Publication Data
US 2013/0292146 A1 Nov. 7, 2013

Related U.S. Application Data

(60) Provisional application No. 61/641,932, filed on May 3, 2012.

(51) Int. Cl.
A47L 11/28 (2006.01)
A47L 11/40 (2006.01)
B62D 11/00 (2006.01)

(52) U.S. Cl.
CPC ............ *A47L 11/28* (2013.01); *A47L 11/4005* (2013.01); *A47L 11/4061* (2013.01); *A47L 11/4066* (2013.01); *B62D 11/003* (2013.01)

(58) Field of Classification Search
CPC .. A47L 11/28; A47L 11/4005; A47L 11/4061; A47L 11/4066

(Continued)

(56) References Cited

U.S. PATENT DOCUMENTS 3,481,417 A 12/1969 Jarret et al.
3,893,530 A 7/1975 Gordon
(Continued)

FOREIGN PATENT DOCUMENTS

DE 4323332 A1 1/1995
DE 4342496 A1 6/1995
(Continued)

OTHER PUBLICATIONS

International Search Report and Written Opinion for Application No. PCT/US2016/013776, mailing date Apr. 5, 2016; issued by the European Patent Office.

(Continued)

*Primary Examiner* — Joseph Rocca
*Assistant Examiner* — Michael Stabley
(74) *Attorney, Agent, or Firm* — Marshall & Melhorn, LLC

(57) ABSTRACT

A floor cleaning or burnishing machine has at least one motor controller that is electrically connected to an analog joystick control, right and left potentiometers, an electrical power source, and right and left electrical drive motors. The right motor is mechanically connected to a right rear steering drive wheel and the left motor is mechanically connected to a left rear steering drive wheel. Rotational speed and direction of each rear wheel is independently controlled, by way of the joystick in cooperation with respective potentiometers, in either a forward or reverse direction. At any given time, each potentiometer controls a respective motor controller which individually controls the rotational speed and direction of a respective wheel, thereby each wheel is capable of rotating in an opposite direction at a different speed to the other wheel. To slow the floor cleaning or burnishing machine down, regenerative braking is utilized by operating the motors as generators.

21 Claims, 11 Drawing Sheets

(58) Field of Classification Search
USPC .......................................................... 180/6.5
See application file for complete search history.

(56) References Cited

U.S. PATENT DOCUMENTS

| | | | |
|---|---|---|---|
| 4,044,848 A | 8/1977 | Wilkins | |
| 4,511,825 A | 4/1985 | Klimo | |
| 4,709,771 A | 12/1987 | Basham et al. | |
| 4,825,500 A | 5/1989 | Basham et al. | |
| 4,953,645 A | 9/1990 | Korber et al. | |
| 4,986,378 A | 1/1991 | Kasper et al. | |
| 5,022,476 A | 6/1991 | Weege | |
| 5,044,043 A | 9/1991 | Basham et al. | |
| 5,064,010 A | 11/1991 | Masbruch et al. | |
| 5,253,724 A | 10/1993 | Prior | |
| 5,622,236 A * | 4/1997 | Azumi | A47L 11/4061 180/168 |
| 5,740,887 A | 4/1998 | Unger | |
| 5,743,347 A | 4/1998 | Gingerich | |
| 5,923,096 A | 7/1999 | Manak | |
| 6,089,341 A | 7/2000 | Gingerich | |
| 6,095,268 A | 8/2000 | Jones, Jr. | |
| 6,202,773 B1 | 3/2001 | Richey, II et al. | |
| 6,386,305 B2 | 5/2002 | Nakakita | |
| 6,457,206 B1 | 10/2002 | Judson | |
| 6,526,336 B2 | 2/2003 | Strothmann | |
| 6,615,937 B2 | 9/2003 | Richey | |
| 6,672,412 B1 | 1/2004 | Charlson | |
| 6,776,249 B2 | 8/2004 | Fortin | |
| 7,041,029 B2 | 5/2006 | Fulghum et al. | |
| 7,138,772 B2 * | 11/2006 | Noro | B60L 15/2036 318/400.01 |
| 7,172,041 B2 * | 2/2007 | Wuertz | B62D 11/04 180/315 |
| 7,533,435 B2 | 5/2009 | Pedlar et al. | |
| 7,730,980 B2 | 6/2010 | Mayer et al. | |
| 8,678,883 B2 * | 3/2014 | Strickland | A47L 11/16 15/340.4 |
| 2005/0132527 A1 | 6/2005 | Pedlar | |
| 2005/0223514 A1 * | 10/2005 | Stuchlik | A47L 11/4038 15/320 |
| 2005/0239594 A1 | 10/2005 | Fulghum et al. | |
| 2005/0247508 A1 | 11/2005 | Gilliland | |
| 2009/0094784 A1 | 4/2009 | Pedlar | |
| 2009/0198414 A1 | 8/2009 | Mohning et al. | |
| 2009/0260901 A1 | 10/2009 | Ishii | |
| 2009/0288685 A1 | 11/2009 | Wolfe et al. | |
| 2013/0292146 A1 | 11/2013 | Fellhauer et al. | |
| 2014/0093345 A1 | 4/2014 | Nakazawa et al. | |

FOREIGN PATENT DOCUMENTS

| | | |
|---|---|---|
| DE | 19503615 A1 | 8/1995 |
| EP | 0404437 A1 | 12/1990 |
| EP | 0951857 A1 | 10/1999 |
| EP | 1319577 A2 | 10/1999 |
| EP | 2387931 A2 | 11/2011 |
| GB | 1360261 | 7/1974 |
| GB | 2223333 A | 4/1990 |
| GB | 2342903 A | 4/2000 |
| JP | 62-177203 U | 11/1987 |
| JP | 2001-104396 A | 4/2001 |
| JP | 2002-149257 A | 5/2002 |
| JP | 2001-92545 A | 10/2002 |
| JP | 2002283906 A | 10/2002 |
| WO | 9423683 A1 | 10/1994 |
| WO | 00/24305 A1 | 5/2000 |
| WO | 2006051105 A1 | 5/2006 |
| WO | 2011057080 A1 | 5/2011 |

OTHER PUBLICATIONS

Curtesy machine-generated English translation of EP2387931A2 obtained via Espacenet Patent Search (URL: http://worldwide.espacenet.com/?locale=en_EP) on Apr. 15, 2016.

* cited by examiner

DIRECTION A

DIRECTION I

DIRECTION M

DIRECTION E

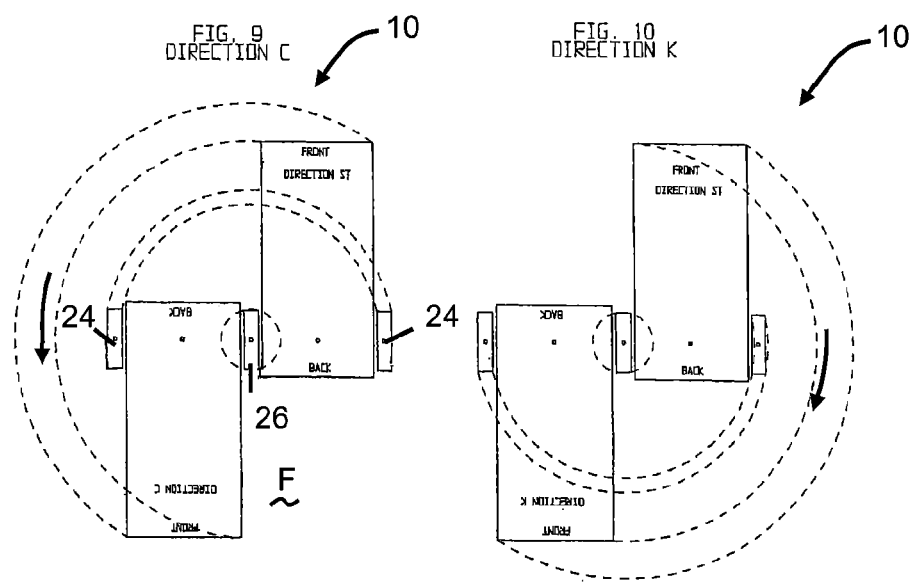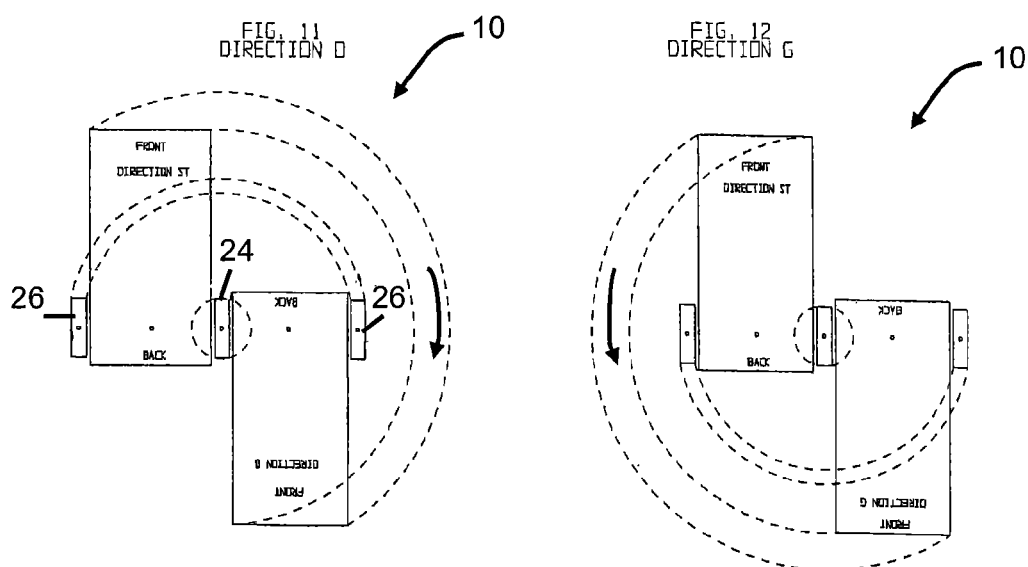

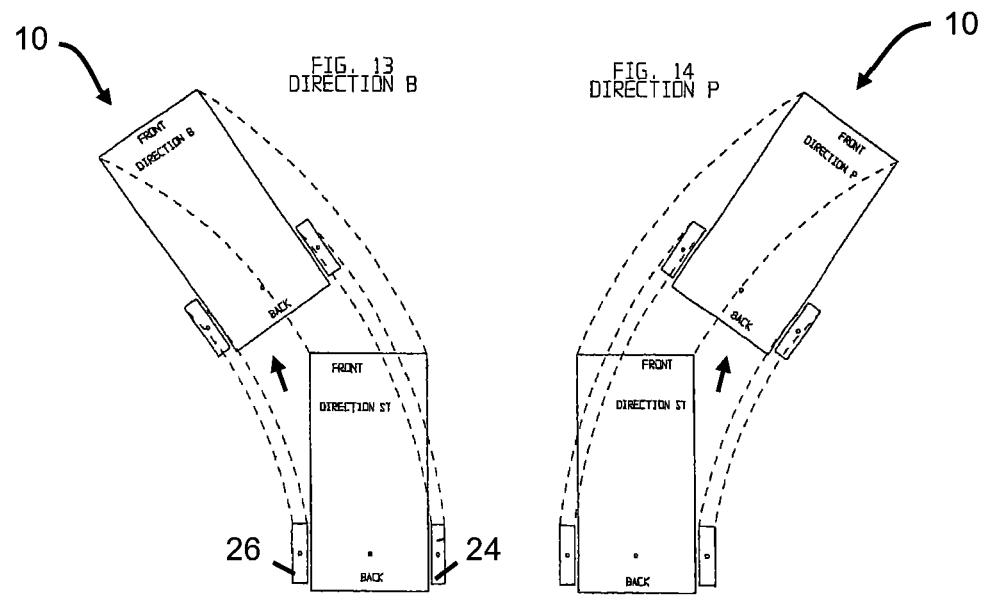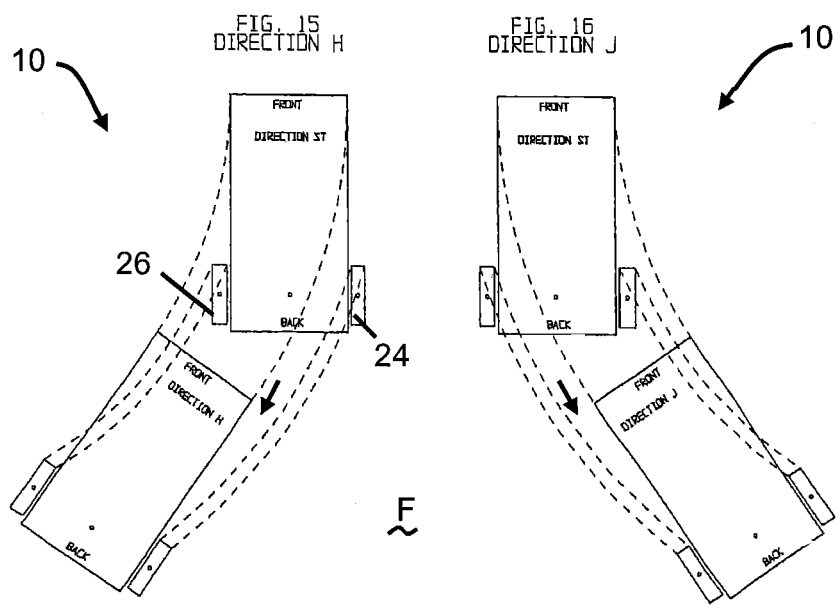

DIRECTION D

DIRECTION N

DIRECTION F

DIRECTION L

DUAL DRIVE FLOOR SCRUBBER

RELATED APPLICATION

This application claims the benefit under 35 U.S.C. §119(e) of U.S. Provisional Patent Application Ser. No. 61/641,932, filed May 3, 2012, which is incorporated by reference herein in its entirety.

FIELD OF THE INVENTION

The present invention relates to a floor cleaning or burnishing machine and, more particularly, to precise control of a floor cleaning or burnishing machine with a joystick.

BACKGROUND OF THE INVENTION

Currently, floor cleaning machines and, in particular, battery powered automatic floor cleaning machines are either walk behind or ride-on type of machines. Floor cleaning machines have many functions including vacuuming, sweeping, buffing, stripping, scrubbing and carpet cleaning. Generally, battery powered automatic floor cleaning machines that are applied in the floor care industry are typically utilized to maintain flooring in large areas.

Although these types of machines are utilized to maintain large floor areas, these vehicles need to be maneuverable while navigating in tight areas and around obstacles. Also, due to their heavy usage, these vehicles should be easy to operate without causing undo stress or strain on an operator.

In general, battery powered automatic floor cleaning machines are comprised of a movable frame/body for carrying a brushing means, reservoirs for storing fresh and spent cleaning liquids, a means for dispensing fresh cleaning liquid onto the floor, and a vacuum pick-up system for recovering spent cleaning liquid from the floor.

Most walk behind machines are battery powered and comprise a frame that is supported by drive wheels and casters for moving the frame, a motor that drives the wheels, casters that aid the drive wheels to steer and also to support the frame above of the floor, and a speed control that is used to operate the drive motor. Further, a throttle may be provided that is generally hand operated and connected to the speed control, wherein the speed control can be configured in one of two ways: a) open ended, meaning that the throttle moves in one direction controlling the speed of the drive motor with a direction switch that is needed for controlling the direction (forward or reverse) of the drive motor, and b) wig-wag speed control, meaning the throttle is moved back and forth in two directions while controlling both speed and direction of the drive motor.

Steering on a walk behind machine is generally accomplished by an operator moving a handle bar, located at the rear of the machine, left or right, thereby pointing the machine in the operator's walking direction. However, maneuvering the floor cleaning machine in this manner can be difficult and fatiguing for the operator.

Most ride-on machines are battery powered which comprise a frame supported by a pair of wheels in the back and a front drive wheel(s) for moving the frame, a motor for driving the front wheel(s), and a speed control for operating the drive motor. In this case, the throttle is generally foot operated and connected to the speed control. Like the walk behind, the ride-on machine's speed control can also be configured in one of two ways, a) open ended and b) a wig-wag speed control, much like that detailed above for the walk behind machines.

Ride-on floor cleaning machines normally further comprise a steering wheel or handle bar coupled to the front drive wheel that moves on the floor. By rotating the steering wheel or handle bar, the operator selects the desired direction, thereby steering the machine. This also can be difficult and fatiguing for the operator who typically needs to maneuver the floor cleaning machine into small tight areas.

One means of controlling a floor cleaning machine is through the use of a joystick. Originally, joysticks were used with cables for mechanically controlling ailerons and elevators on some of the first airplanes. More recently, joystick type controls have been applied to control heavy equipment, cranes, marine vessels, lawn equipment, video games, and cleaning machines.

U.S. Pat. No. 7,730,980 to Mayer et al., hereinafter Mayer, discloses another means of controlling a cleaning machine that uses independently driven drive wheels and casters, where a steering system, such as a steering wheel or handle bar, is coupled to the frame. Also, this cleaning machine may have a separate control system that is either hand or foot operated, for controlling the speed and forward or reverse direction of the machine. The steering system, when pivoted around an axis, sends a signal to the controller that speeds up or slows down the driven drive wheels allowing the machine to change direction from left to right. The Mayer system is, however, limited by its drive control because the operator still has two machine controls, those being a steering member and a throttle to control the machine. Also, the maneuverability of the machine is limited by pivoting around on a single axis by the wheels.

U.S. Pat. No. 7,041,029 to Fulghum et al., hereinafter Fulghum, teaches yet another means for controlling a cleaning machine, which is to use a drive system with a powered front wheel steering system. In this patent, a joystick system provides forward and reverse speed signals to the drive system and an input to the powered front wheel steering system for controlling the direction of the front wheel so as to allow for the cleaning machine to turn left or right. Hence, the Fulghum cleaning machine uses the directional front wheel to steer the machine along the floor, wherein the sharper the steering angle the lower the maximum traverse speed.

Still, there is a need for a floor cleaning/burnishing machine that more accurately controls the speed and steering of a ride-on, battery operated floor cleaning/burnishing machine, so as to more precisely maneuver and navigate during cleaning and burnishing, thereby saving operator time and cleaning chemical costs. It would further be advantageous if such a machine would allow the operator to use only a single hand. Therefore, what is sought is a cleaning/burnishing machine that provides easy one hand operation of an automatic floor cleaning machine while being highly maneuverable and easy to navigate in tight areas and around obstacles, all the while reducing operator fatigue.

SUMMARY OF THE INVENTION

A floor cleaning or burnishing machine has at least one motor controller that is electrically connected to an analog joystick, individual right and left potentiometers, an electrical power source, and individual right and left electrical drive motors. The right drive motor is mechanically connected to a right rear steering drive wheel and the left electrical drive motor is mechanically connected to a left rear steering drive wheel. Rotational speed and direction of each rear steering drive wheel is independently controlled, by way of the joystick in cooperation with respective potentiometers, in either a forward or reverse direction. At any given time, each potentiometer controls a respective motor controller which individually controls the rotational speed and direction of a respective rear drive wheel, thereby each rear drive wheel is capable of rotating in an opposite direction at a different speed to the other drive wheel.

BRIEF DESCRIPTION OF THE DRAWINGS

The advantages of the present invention will become readily apparent to those skilled in the art from the following detailed description when considered in light of the accompanying drawings in which:

FIG. 9 is a top view of the floor cleaning/burnishing machine of FIG. 1 operated in direction C;

FIG. 10 is a top view of the floor cleaning/burnishing machine of FIG. 1 operated in direction K;

FIG. 11 is a top view of the floor cleaning/burnishing machine of FIG. 1 operated in direction O;

FIG. 12 is a top view of the floor cleaning/burnishing machine of FIG. 1 operated in direction G;

FIG. 13 is a top view of the floor cleaning/burnishing machine of FIG. 1 operated in direction B;

FIG. 14 is a top view of the floor cleaning/burnishing machine of FIG. 1 operated in direction P;

FIG. 15 is a top view of the floor cleaning/burnishing machine of FIG. 1 operated in direction H;

FIG. 16 is a top view of the floor cleaning/burnishing machine of FIG. 1 operated in direction J;

Further aspects of the present invention, together with the organization and operation thereof, will become apparent from the following detailed description of the invention when taken in conjunction with the accompanying drawings.

DETAILED DESCRIPTION OF THE INVENTION

It is to be understood that the invention may assume various alternative orientations and step sequences, except where expressly specified to the contrary. It is also to be understood that the specific devices and processes illustrated in the attached drawings, and described in the following specification are simply exemplary embodiments of the inventive concepts. Hence, specific dimensions, directions or other physical characteristics relating to the embodiments disclosed are not to be considered as limiting, unless expressly stated otherwise.

Figure 1:
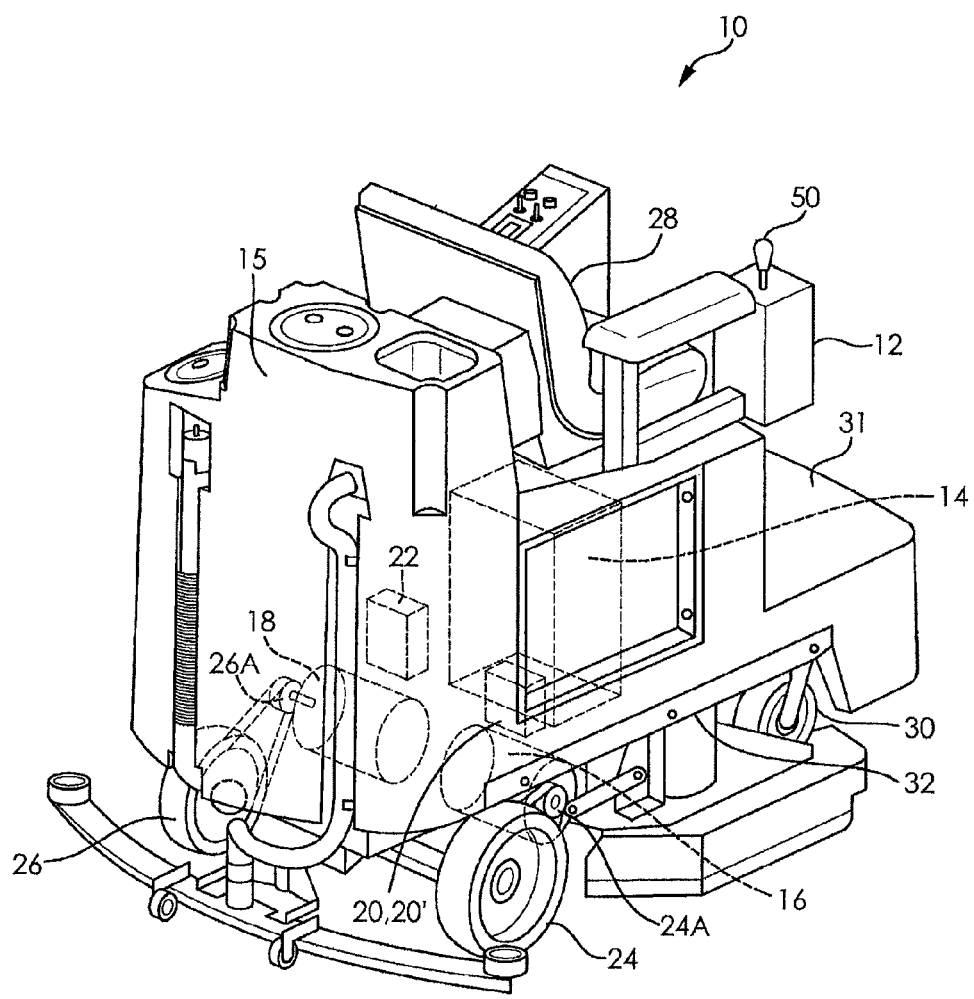
FIG. 1 is an isometric view from the right rear of a floor cleaning/burnishing machine that may be used with the present invention.

FIG. 1 illustrates a ride-on floor cleaning/burnishing machine 10 having an analog joystick control 12, an electric power source 14, at least one cleaning tank 15, right and left electrical drive motors 16, 18, right and left motor controller portions 20, 22 or a single motor controller 20' that controls both right and left motors, and right and left rear steering drive wheels 24, 26. The ride-on floor cleaning/burnishing machine 10 may utilize the cleaning tank 15 to clean or burnish a floor F.

Also shown in FIG. 1 are a seat 28, where an operator of the floor cleaning/burnishing machine 10 sits while operating the machine 10, and at least one caster 30 that aids in maneuvering and supporting a frame 32 of the machine 10 above the floor F. A platform 31, which extends toward the front of the machine 10 from below the seat 28, is provided for resting the operator's feet as the operator controls the machine 10. Except for the drive wheels 24, 26 and caster 30, all other items are supported by the frame 32.

Figure 1A:
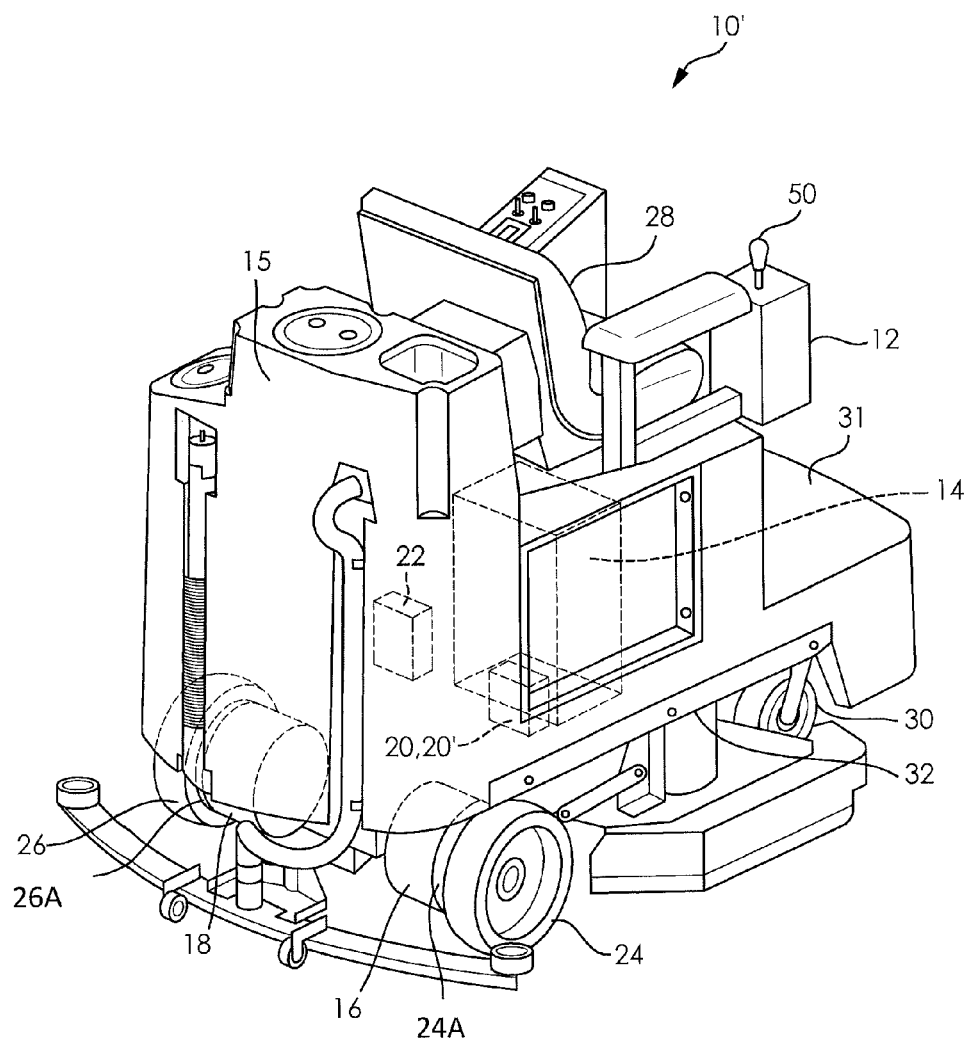
FIG. 1A is an isometric view from the right rear of another floor cleaning/burnishing machine that may be used with the present invention.
Figure 2:
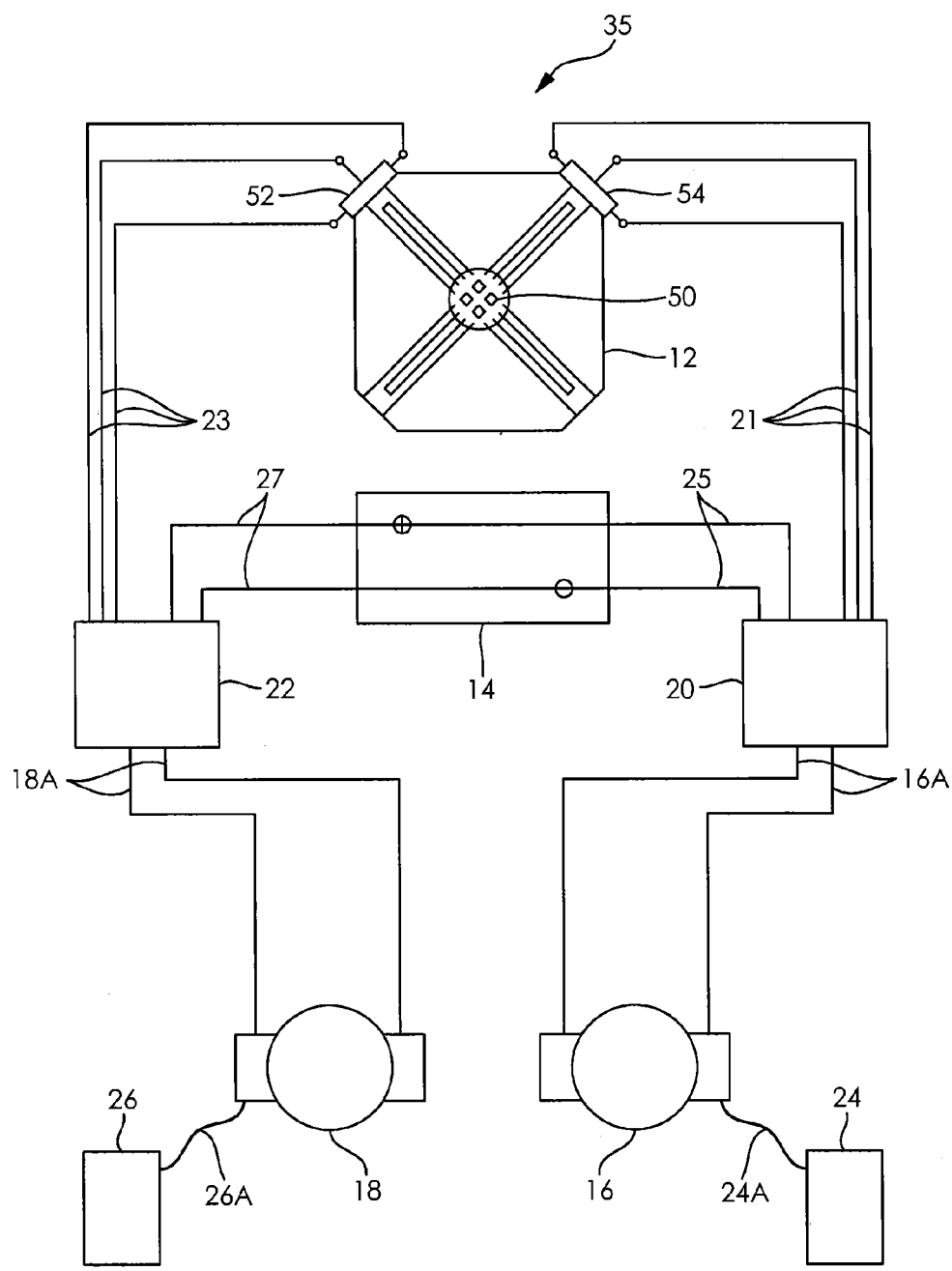
FIG. 2 is an electrical schematic of a first embodiment of the floor cleaning/burnishing machine of FIG. 1 having two motor controllers.

FIG. 2 is an electrical schematic of a first embodiment 35 of the present invention, where the motor controllers 20, 22 are separately connected through individual electrical communication lines 21, 23 with respective potentiometers 54, 52 of the analog joystick control 12. The motor controllers 20, 22 are also separately connected through individual electrical communication lines 25, 27 with the electrical power source 14. The right electrical drive motor 16 is in separate electrical communication, by way of right motor control lines 16A, with the right motor controller 20. The right electrical drive motor 16 is in mechanical communication, by way of right mechanical linkage 24A, which may be, for example, a direct drive mechanism 24A for a ride-on floor cleaning/burnishing machine 10' as shown in FIG. 1A or a belt drive and pulley as shown in FIG. 1, with the right rear steering drive wheel 24 (also see FIG. 1). The left electrical drive motor 18 is in separate electrical communication, by way of left motor control lines 18A, with the left motor controller 22. The left electrical drive motor 18 is in mechanical communication, by way of left mechanical linkage 26A or left direct drive mechanism 26A, with the left rear steering drive wheel 26. Hence, the velocity (i.e., speed in a forward or reverse direction) and the direction of rotation of each rear steering drive wheel 24, 26 are separately controlled by the corresponding motor controller 20, 22, via the analog joystick control 12 and potentiometers 54, 52, independent of the other drive wheel 24, 26, for precise movement and steering control of the floor cleaning machine 10 across the floor F.

Figure 21:
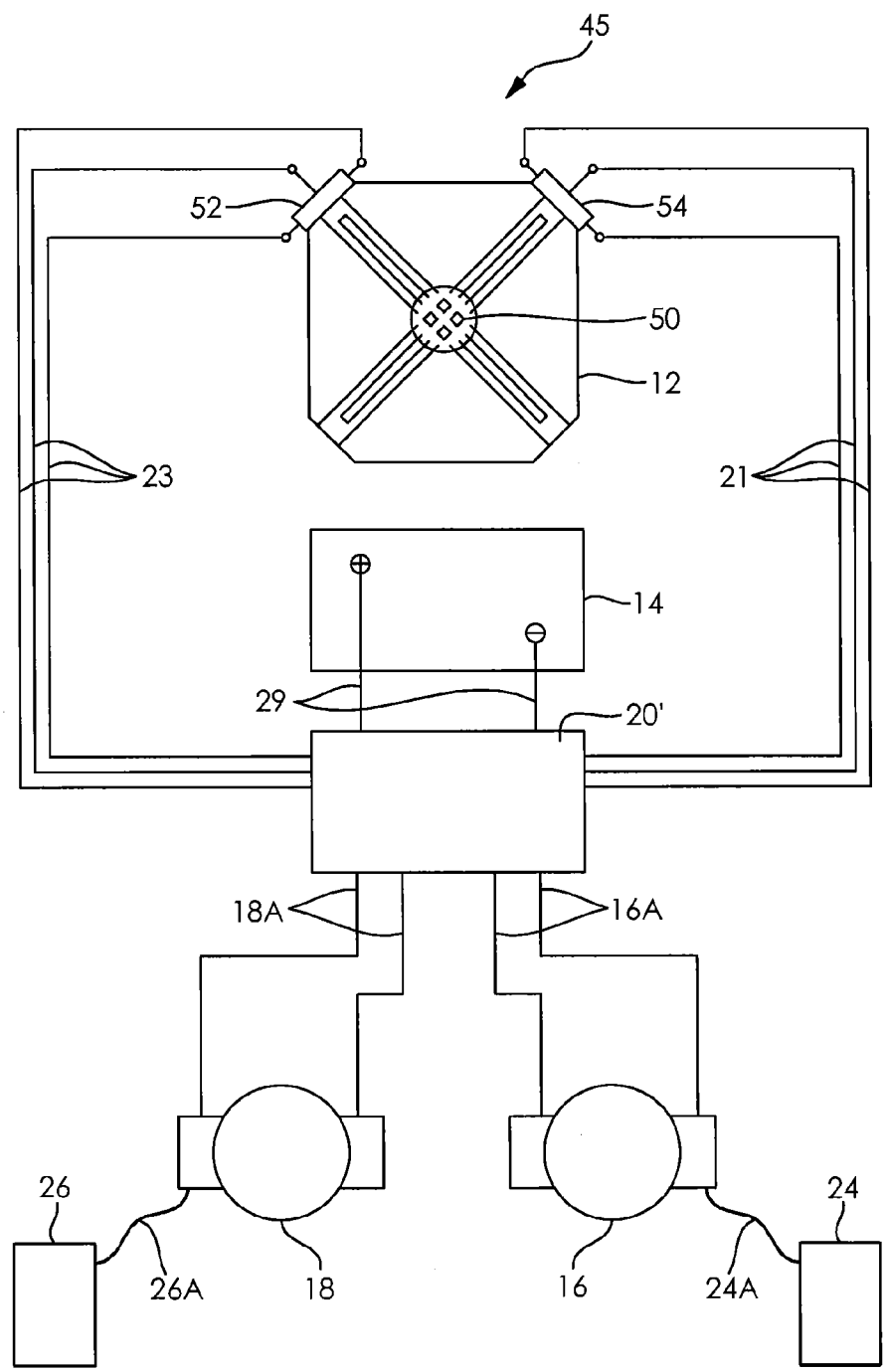
FIG. 21 is an electrical schematic of a second embodiment of the floor cleaning/burnishing machine of FIG. 1 having a single motor controller.

Similarly, FIG. 21 is an electrical schematic of a second embodiment 45 of the present invention, where a single motor controller 20' (which may be the motor controller 20, as seen in FIG. 2, with the two (2) separate sets of motor control lines 16A, 18A and separate electrical communication lines 21, 23) may be used in place of two (2) separate motor controllers 20, 22. The single motor controller 20' is separately electrically connected through individual electrical communication lines 23, 21 with respective left and right potentiometers 52, 54 of the analog joystick control 12, and is separately electrically connected to electrical communication line 29 with the electrical power source 14. Hence, the right and left electrical drive motors 16, 18 are still in separate electrical communication, by way of corresponding motor control lines 16A, 18A, with the common motor controller 20'.

As a result, in either of the two embodiments 35, 45, the floor cleaning machine 10 is easy and simple to drive for the operator who moves a joystick lever 50, as depicted in FIGS. 1, 2, 21, with various combinations of fore and aft and side-to-side motion, which is specifically described in detail below. The floor cleaning machine 10 can be steered at various speeds (where direction and speed comprise velocity) and with various radii of curvature on the floor or even pivoted in one spot, as illustrated in FIGS. 3-20. Therefore, precise control of the floor cleaning machine 10 across the floor F is provided by the present invention.

The floor cleaning machine 10 is in contrast to those conventional floor cleaning machines that may only control the lineal speed where, at any given time, the conventional floor cleaning machines wheels rotate in the same radial direction and steering is control by other means than that of the present invention. Hence, at any given time, such conventional floor cleaning machines, like the Mayer apparatus, would be limited to a single pivot point around the wheels because this conventional machine's wheels are not designed to be controlled to rotate in opposite directions, as those drive wheels 24, 26 of the present invention.

More specifically, FIG. 2 illustrates the electrical power source 14, which is typically a direct current battery pack, supplying electrical power to the left motor controller 22 and the right motor controller 20. The analog joystick control 12, which includes a control lever 50 that is pivotally mounted for 360 degrees of motion, electrically connects the respective potentiometers 52, 54 to their corresponding drive motors 18, 16, where each potentiometer 52, 54 resides within the joystick control 12. The control lever 50 is mounted at a 45 degree angle from the X and Y axes and 90 degrees from each of the other axes as shown as L and R axes in FIG. 3. With this combination of X and Y, and L and R axes, the selection of speed and direction of rotation afforded the two drive wheels 24, 26 is very large.

In general, the floor cleaning or burnishing machine 10 has at least one motor 20, 20', 22 controller that is electrically connected to the analog joystick 50, individual right and left potentiometers 54, 52, an electrical power source 14, and individual right and left electrical drive motors 16, 18. The right drive motor 16 is mechanically connected to the right rear steering drive wheel 24 and the left electrical drive motor 18 is mechanically connected to the left rear steering drive wheel 26. Rotational speed and direction of each rear steering drive wheel 24, 26 is independently controlled, by way of the joystick 50 in cooperation with respective potentiometers 54, 52, in either a forward or reverse direction. At any given time, each potentiometer 54, 52 controls a respective motor controller 20, 20', 22 which individually controls the rotational speed and direction of a respective drive wheel 24, 26, thereby each drive wheel 24, 26 is capable of rotating in an opposite direction at a different speed to the other drive wheel 26, 24.

For either embodiment illustrated in FIG. 2 or 21, the floor cleaning machine 10 may operate in a wig-wag (known as center-off) configuration meaning that the potentiometers 52, 54 control both speed and direction of the drive motors. When the joystick control lever 50 is in the center position (i.e., direction) the potentiometers 52, 54 are also in the center position. The joystick control lever 50 is spring loaded to an off position ST. Hence, when the joystick control lever 50 is released, it will always return to the off position ST.

Figure 22:
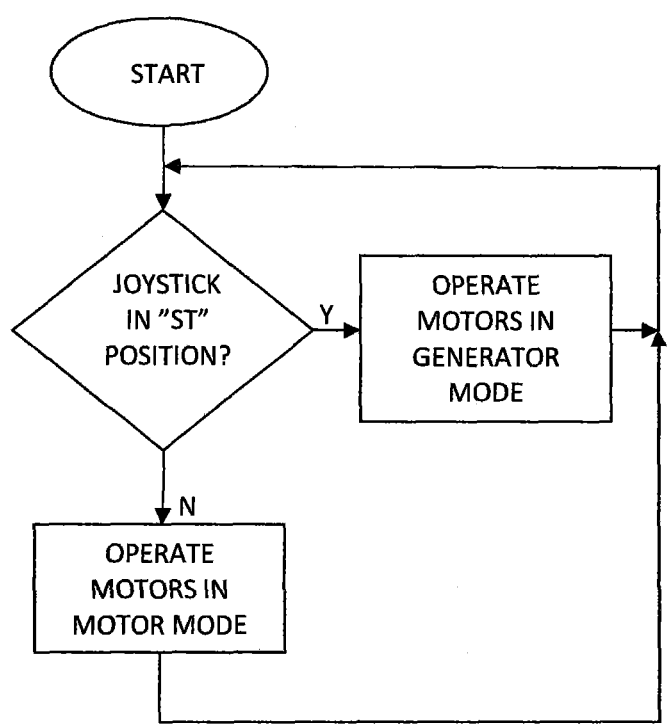
FIG. 22 is logic diagram of motor operations, in accordance with the present invention.

FIG. 22 illustrates the logical operation of the motors 16, 18 in either a "motor" mode or in a "generator" mode. When the joystick lever 50 is in the ST position, the motors 16, 18 are operated in the "generator" mode. When the joystick lever 50 is not in the ST position, the motors 16, 18 are operated in the "motor" mode. Quite simply, in operating the motors 16, 18 in the "generator" mode, the motors 16, 18 become electrical generators whose output is then mechanically applied to the wheels 24, 26 in reverse, in order to slow down (i.e., apply brakes to) the wheels 24, 26. This form of braking is known as regenerative braking. In operating the motors 16, 18 in the "motor" mode, the motors 16, 18 are electrically operated as motors whose mechanical output is then mechanically applied to the wheels 24, 26 in order to drive the wheels 16, 18.

Figure 23:
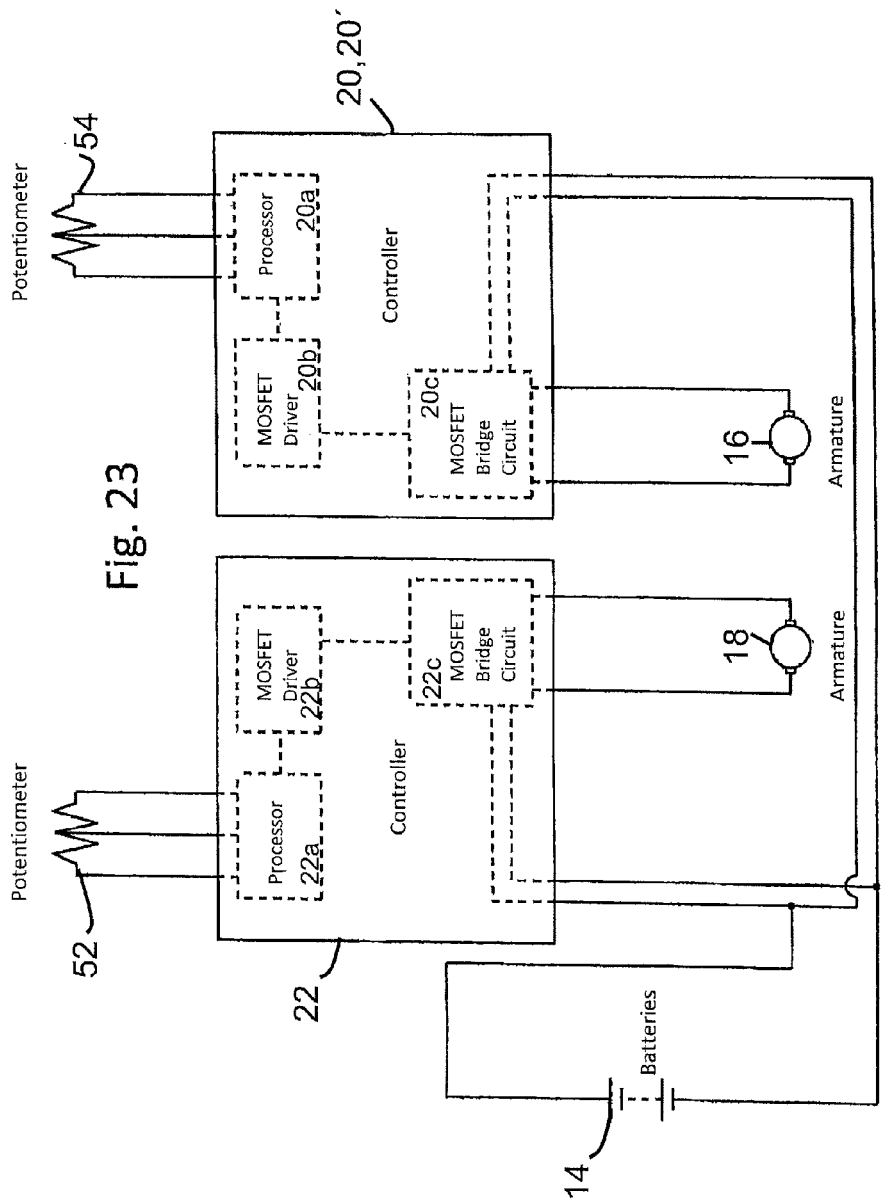
FIG. 23 is an electrical schematic of the electrical connection to the internal circuit of the motor controllers.

FIG. 23 illustrates that each (right, left) of the controllers 20, 22 internally comprises a processor 20a, 22a, a MOSFET driver 20b, 22b, and a MOSFET bridge circuit 20c, 22c, which are correspondingly connected to the potentiometers 54, 52, power source 14 (batteries), and electrical drive motors 16, 18.

Figure 3:
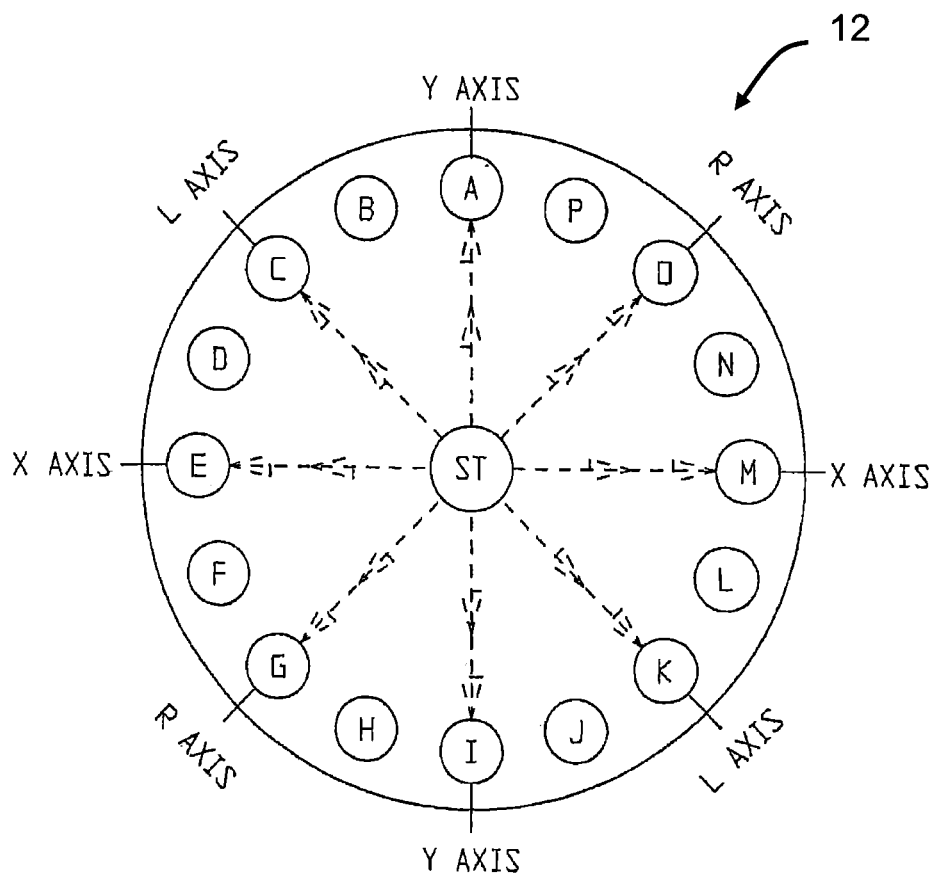
FIG. 3 is a diagrammatic view of basic joystick directions A-P and ST for the floor cleaning/burnishing machine of FIG. 1.

Referring to FIG. 3, as the control lever 50 in the joystick control 12 moves away from the center position ST, the potentiometers 52, 54 will move from the center unless the joystick control lever 50 moves along the L or R axis, in which case the potentiometer 52 or 54 connected to the L or R axis will not move. With this arrangement, the movement of the control lever 50 in the analog joystick control 12 can move each potentiometer 52, 54 independently, producing separate output signals that determine a selected drive wheel speed and at the same time a selected drive wheel direction of rotation for each drive motor 16, 18. The motor controllers 20, 22 interpret the analog signals from the analog joystick control 12 and transforms the supplied battery voltage and polarity (shown as (+) and (−) on the power source 14 in FIGS. 2 and 21) into the electrical current needed to move the left rear drive motor 18 and right rear drive motor 16, coupled to the corresponding drive wheels 26, 24 at independent speeds and rotational directions for moving the floor cleaning machine 10.

Accordingly, the two rotational directions (fore and aft) of the drive wheels 26, 24 may be different. The same above-described function of the joystick control lever 50 takes place with the single motor controller 20', as shown in FIG. 21, which replaces the two separate motor controllers 20, 22, while retaining the separate corresponding sets of motor control lines 16A, 18A.

Although not shown, another variation of the above described joystick control 12 is to use contactless sensing or Hall Effect technology in place of the potentiometers in the joystick control 12 so as to communicate analog signals, proportional to the movements of the joystick lever 50, onto the motor controllers 20, 20', 22.

Specifically, the analog joystick control 12, as detailed in FIGS. 2 and 21, associates the position of the joystick lever 50 with the direction of movement of the independent drive wheels 24, 26 for maneuvering the floor cleaning machine 10. The floor cleaning machine 10 will move in relationship to the position/direction that the joystick lever 50 is pointing at a speed in relationship to how far from the center position ST it moves, as shown in FIG. 3.

As a result of the joystick control 12, the floor cleaning machine 10 is very maneuverable by allowing movement in any direction, at any speed, which includes rotating the drive wheels in opposite radial directions at the same time. This is achieved by utilizing the movement of the control lever 50 in respect to the X and Y axes in combination with the L and R axes, as also shown in FIG. 3. The following are the specifics associated with each of the positions/directions A-P and ST of the joystick control 12 that are detailed for the X, Y, R, and L axes and halfway between these positions. In reality, there are an infinite number of positions within the 360° that is available for the control lever 50 to span. It is noteworthy that the X and Y axes in combination with the L and R axes, as illustrated above FIG. 4 in FIG. 3, shows the movement or non-movement of the floor cleaning machine 10 over the floor F for FIG. 4 and is applied to the subsequent FIGS. 5-20, as it applies to these axes X, Y, L, R.

Figure 4:
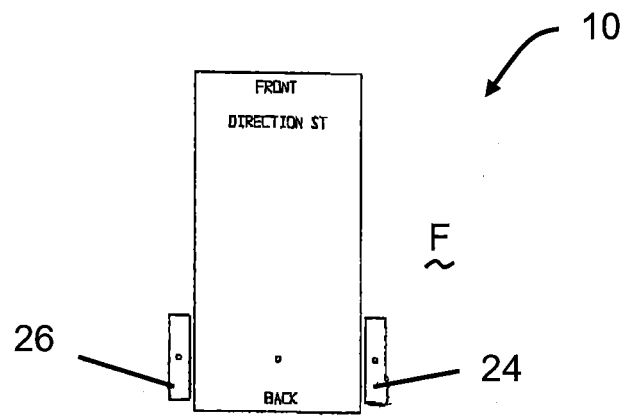
FIG. 4 is a top view of the floor cleaning/burnishing machine of FIG. 1 operated in direction ST.

Regarding position ST, when the joystick lever 50 is in the center position/direction ST, the floor cleaning machine 10 is stopped or at rest (see FIG. 4). The left and right drive wheels 26, 24 receive no voltage or polarity signal via motor control lines 18A, 16A from the joystick control 12. The floor cleaning machine 10 will not move until the joystick lever 50 is moved in the direction the operator chooses for the floor cleaning machine 10 to go.

Figure 5:
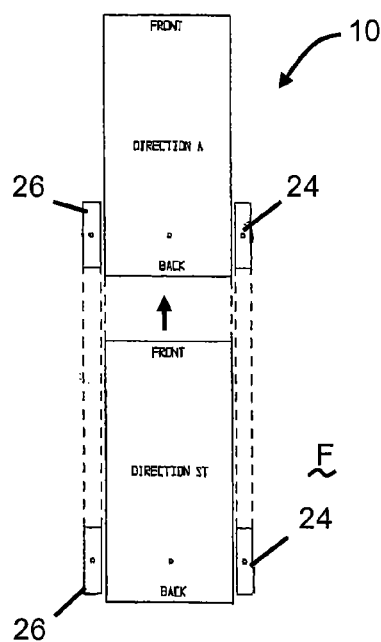
FIG. 5 is a top view of the floor cleaning/burnishing machine of FIG. 1 operated in direction A.

Regarding direction A, when the joystick lever 50 moves straight forward (as seen by the arrow pointing up between the two images of the machine 10 in FIG. 5) away from the center along the Y axis in a positive direction, both drive wheels 24, 26 of the floor cleaning machine 10 begin to rotate slowly in the same direction moving the floor cleaning machine 10 in a straight forward direction A. As the position of the joystick lever 50 moves farther away from the center along the Y axis, the rotation of the drive wheels 24, 26 will increase. Thus, the machine 10 will increase in speed in a straight forward direction A.

Figure 6:
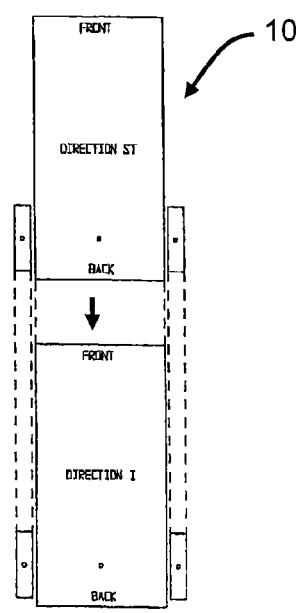
FIG. 6 is a top view of the floor cleaning/burnishing machine of FIG. 1 operated in direction I.
Figure 7:
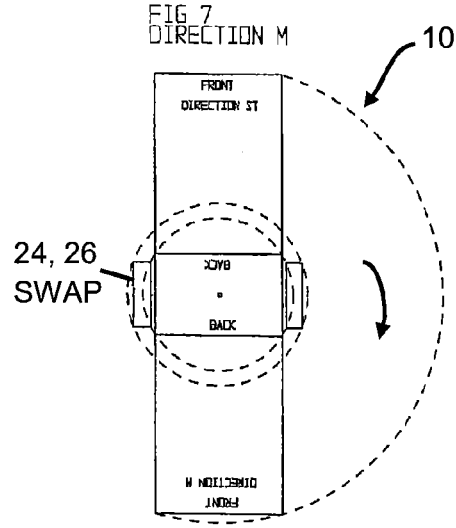
FIG. 7 is a top view of the floor cleaning/burnishing machine of FIG. 1 operated in direction M.
Figure 8:
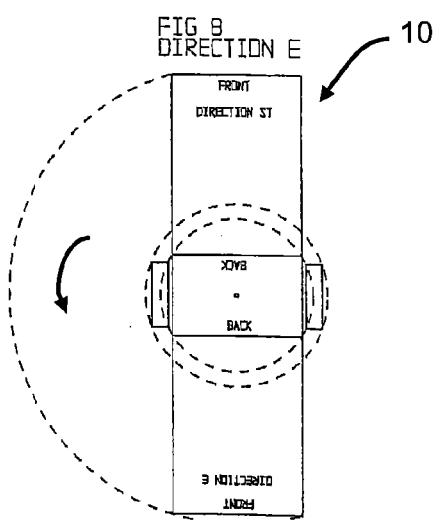
FIG. 8 is a top view of the floor cleaning/burnishing machine of FIG. 1 operated in direction E.

Regarding direction I, when the joystick lever 50 moves straight backward away (see arrow pointing down between the two images of the machine 10 in FIG. 6) from the center along the Y axis in a negative direction both drive wheels 24, 26 of the floor cleaning machine 10 begin to rotate slowly in the same direction moving the floor cleaning machine 10 in a straight reverse direction I. As the position of the joystick lever 50 moves farther away from the center along the Y axis in a negative direction, the rotation of the drive wheels 24, 26 will increase. Thus, the machine 10 will increase in speed in a straight reverse direction I.

Regarding direction M, when the joystick lever 50 moves away from the center along the X axis in a positive direction the left drive wheel 26 will rotate in a forward direction and the right drive wheel 24 will rotate in a reverse direction, both at equal speeds, causing the floor cleaning machine 10 to pivot to the right around the center distance between the left and right drive 26, 24 (see clockwise arrow pointing down in FIG. 7, direction M), thereby the left and right drive wheels 26, 24 swap positions, that is where each rear wheel 26, 24 takes the position of the other rear wheel 24, 26 in a 180 degree turn. As the position of the joystick lever 50 moves farther away from the center along the X axis in a positive direction, the rotation of the drive wheels 24, 26 will increase. Thus, the floor cleaning machine 10 will increase in speed rotating right in direction M.

Regarding direction E, when the joystick lever 50 moves away from the center along the X axis in a negative direction the left drive wheel 26 will rotate in a reverse direction and the right drive wheel 24 will rotate in a forward direction, both at equal speeds, causing the floor cleaning machine 10 to pivot to the left around the center distance between the left and right drive wheels 26, 24 (see counterclockwise arrow in FIG. 8, direction E), thereby the left and right drive wheels 26, 24 swap positions. As the position of the joystick lever 50 moves farther away from the center along the X axis in a negative direction, the rotation of the drive wheels 24, 26 will increase. Thus, the machine 10 will increase in speed rotating left in direction E.

Regarding direction C, when the joystick lever 50 moves away from the center along the L axis in a positive direction the left drive wheel 26 is stopped and the right drive wheel 24 will be moving in a forward direction. The floor cleaning machine 10 will pivot in position to the left on the center of the left drive wheel 26 (see counterclockwise arrow in FIG. 9, direction C), where the left rear steering drive wheel 26 is capable of remaining in a pivot position. As the position of the joystick lever 50 moves farther away from the center along the L axis in a positive direction, the rotational speed of the right drive wheel 24 will increase. Thus, the machine 10 will increase in speed rotating to the left in direction C.

Regarding direction K, when the joystick lever 50 moves away from the center along the L axis in a negative direction the left drive wheel 26 is stopped and the right drive wheel 24 will be moving in a reverse direction. The floor cleaning machine 10 will pivot in position to the right on the center of the left drive wheel 26 (see arrow in a clockwise direction in FIG. 10, direction K), where the left rear steering drive wheel 26 is capable of remaining in a pivot position. As the position of the lever 50 moves farther away from the center along the L axis in a negative direction, the rotational speed of the right drive wheel 24 will increase. Thus, the machine 10 will increase in speed rotating to the right in direction K.

Regarding direction O, when the joystick lever 50 moves away from the center along the R axis in a positive direction the right drive wheel 24 is stopped and the left drive wheel 26 will be moving in a forward direction. The floor cleaning machine 10 will pivot in position to the right on the center of the right drive wheel 24 (see arrow in a clockwise direction in FIG. 11, direction O), where the right rear steering drive wheel 24 is capable of remaining in a pivot position. As the position of the joystick lever 50 moves farther away from the center along the R axis in a positive direction, the rotational speed of the left drive wheel 26 will increase. Thus, the machine 10 will increase in speed rotating to the right in direction O about the right rear steering drive wheel 24.

Regarding direction G, when the joystick lever 50 moves away from the center along the R axis in a negative direction the right drive wheel 24 is stopped and the left drive wheel 26 will be moving in a reverse direction. The floor cleaning machine 10 will pivot in position to the left on the center of the right drive wheel 24 (see arrow in a counterclockwise direction in FIG. 12, direction G), where the right rear steering drive wheel 24 is capable of remaining in a pivot position. As the position of the joystick lever 50 moves farther away from the center along the R axis in a negative direction, the rotational speed of the left drive wheel 26 will increase. Thus, the machine 10 will increase in speed rotating to the left in direction G.

Regarding direction B, as the joystick lever 50 is positioned between the Y axis in a negative direction and the L axis in a positive direction, the inside turning left drive wheel 26 is rotating in a forward direction slower than the outside turning right drive wheel 24 in a forward direction, causing the floor cleaning machine 10 to turn to the left while moving forward (see arrow veering toward the top left in FIG. 13, direction B). As the position of the joystick lever 50 moves around between the Y axis and the L axis, the rotational speed of the wheels 24, 26 will change respectively controlling how sharp the machine 10 turns to the left while moving forward in direction B.

Regarding direction P, as the joystick lever 50 is positioned between the Y axis in a positive direction and the R axis in a positive direction, the inside turning right drive wheel 24 is rotating in a forward direction slower than the outside turning left drive wheel 26 in a forward direction, causing the floor cleaning machine 10 to turn to the right while moving forward (see arrow veering toward the top right FIG. 14, direction P). As the position of the joystick lever 50 moves around between the Y axis and the R axis, the rotational speed of the wheels 24, 26 will change respectively controlling how sharp the machine 10 turns to the right while moving forward in direction P.

Regarding direction H, as the joystick lever 50 is positioned between the Y axis in a negative direction and the R axis in a negative direction, the inside turning left drive wheel 26 is rotating in a reverse direction slower than the outside turning right drive wheel 24 in a reverse direction causing the floor cleaning machine 10 to turn to the left while moving backward (see arrow veering toward the bottom left in FIG. 15, direction H). As the position of the joystick lever 50 moves around between the Y axis and the R axis, the rotational speed of the wheels 24, 26 will change respectively controlling how sharp the machine 10 turns to the left while moving backward in direction H.

Regarding direction J, as the joystick lever 50 is positioned between the Y axis in a positive direction and the R axis in a negative direction, the inside turning right drive wheel 24 is rotating in a reverse direction slower than the left drive wheel 26 in a reverse direction causing the floor cleaning machine 10 to turn to the right while moving backward (see arrow veering toward the bottom right in FIG. 16, direction J). As the position of the joystick lever 50 moves around between the Y axis and the L axis, the rotational speed of the wheels 24, 26 will change respectively controlling how sharp the machine 10 turns to the right while moving backward in direction J.

Figure 17:
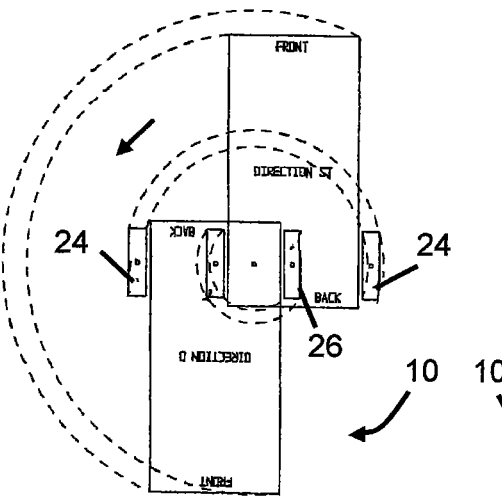
FIG. 17 is a top view of the floor cleaning/burnishing machine of FIG. 1 operated in direction D.

Regarding direction D, as the joystick lever 50 is positioned between the X axis in a positive direction and the L axis in a negative direction, the left drive wheel 26 is rotating in a reverse direction slower than the right drive wheel 24 in a forward direction causing the floor cleaning machine 10 to turn on an axis between the center of the left drive wheel 26 and the center between both drive wheels 24, 26 allowing the floor cleaning machine 10 to make a tight turn to the left (see arrow in a counterclockwise direction in FIG. 17, direction D). As the position of the joystick lever 50 moves around between the Y axis and the L axis, the rotational speed of the wheels 24, 26 of the floor cleaning machine 10 will change respectively controlling how sharp the floor cleaning machine 10 rotates or turns to the left in direction D.

Figure 18:
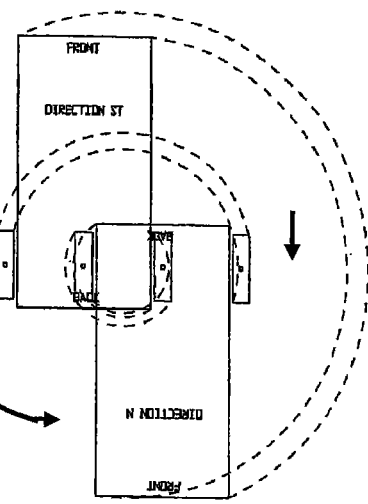
FIG. 18 is a top view of the floor cleaning/burnishing machine of FIG. 1 operated in direction N.

Regarding direction N, as the joystick lever 50 is positioned between the X axis in a positive direction and the R axis in a negative direction, the left drive wheel 26 is rotating in a forward direction faster than the right drive wheel 24 in a reverse direction causing the floor cleaning machine 10 to turn on an axis between the center of the right drive wheel 24 and the center between both drive wheels 24, 26 allowing the floor cleaning machine 10 to make a tight turn to the right (see arrow in a clockwise direction in FIG. 18, direction N). As the position of the joystick lever 50 moves around between the X axis and the R axis, the rotational speed of the wheels 24, 26 will change respectively controlling how sharp the machine 10 rotates or turns to the right direction N.

Figure 19:
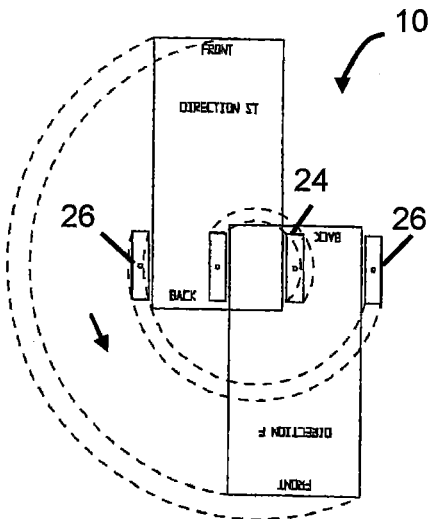
FIG. 19 is a top view of the floor cleaning/burnishing machine of FIG. 1 operated in direction F.

Regarding direction F, as the joystick lever 50 is positioned between the X axis in a negative direction and the R axis in a positive direction, the right drive wheel 24 is rotating in a forward direction slower than the left drive wheel 26 in a reverse direction causing the floor cleaning machine 10 to turn to the left on an axis between the center of the right drive wheel 24 and the center between both drive wheels 24, 26 allowing the floor cleaning machine 10 to make a tight turn to the left (see arrow in a counterclockwise direction in FIG. 19, direction F). As the position of the joystick lever 50 moves around between the X axis and the R axis, the rotational speed of the wheels 24, 26 will change respectively controlling how sharp the machine 10 rotates or turns to the left in direction F.

Figure 20:
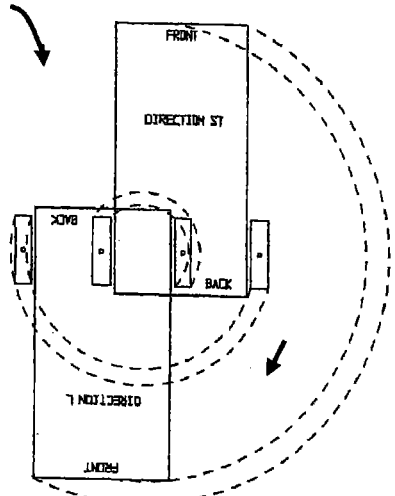
FIG. 20 is a top view of the floor cleaning/burnishing machine of FIG. 1 operated in direction L.

Regarding direction L, as the joystick lever 50 is positioned between the X axis in a negative direction and the L axis in a positive direction, the left drive wheel 26 is rotating in a forward direction slower than the right drive wheel 24 in a reverse direction causing the floor cleaning machine 10 to turn on an axis between the center of the right drive wheel 24 and the center between both drive wheels 24, 26 allowing the floor cleaning machine 10 to make a tight turn to the right (see arrow in a clockwise direction in FIG. 20, direction L). As the position of the joystick lever 50 moves around between the X axis and the L axis, the rotational speed of the wheels 24, 26 will change respectively controlling how sharp the machine 10 rotates or turns to the right in direction L.

As can be seen from the above description, the floor cleaning/burnishing machine 10 more accurately controls the speed and steering of a ride-on, battery operated floor cleaning/burnishing machine 10 than conventional floor cleaning machines, thereby saving operator time and cleaning chemical costs. As a result, the floor cleaning/burnishing machine 10 is more precise in maneuvering and navigation across a floor F, in tight situations, and around objects. This machine allows an operator to use only a single hand to navigate in tight areas and around obstacles, all the while reducing operator fatigue.

In accordance with the provisions of the patent statutes, the present invention has been described in what is considered to represent its preferred embodiments. However, it should be noted that the invention can be practiced otherwise than as specifically illustrated and described without departing from its spirit or scope.

What is claimed is:
1. A floor cleaning machine, comprising:
an analog joystick;
an electrical power source;
at least one motor controller in electrical communication between the analog joystick and the electrical power source;
a right electrical drive motor in electrical communication with the motor controller and in mechanical communication with a right rear steering drive wheel; and a left electrical drive motor in electrical communication with the motor controller and in mechanical communication with a left rear steering drive wheel;

wherein the right rear steering drive wheel and the left rear steering drive wheel are not in mechanical communication with each other and rotational speed and rotational direction of each rear steering drive wheel is independent of the other rear steering drive wheel, on a floor to be cleaned;

at least one potentiometer electrically connected between the analog joystick and the motor controller, the potentiometer controls the independent rotational speeds and rotational directions of the right and left rear steering drive wheels;

wherein the analog joystick has a stop position where the motors are a regenerative brake and the analog joystick has any other position where the motors are rotationally mechanically connected to the rear steering drive wheels;

wherein the analog joystick is spring loaded to the stop position; and wherein the motor controller comprises a processor electrically connected to the potentiometer and electrically connected to a driver that in turn is electrically connected to a bridge circuit that in turn is electrically connected to the right and left electrical drive motors.

2. The floor cleaning machine of claim 1, wherein the at least one motor controller comprises separate right and left motor controllers being individually electrically connected to the analog joystick, the electrical power source, and to respective right and left electrical drive motors.

3. The floor cleaning machine of claim 1, wherein the at least one potentiometer comprises right and left potentiometers electrically connected between the joystick and the motor controller, the right and left potentiometers cooperate to control the independent rotational speeds and rotational directions of the right and left steering drive wheels.

4. The floor cleaning machine of claim 3, wherein the potentiometers comprise contactless sensing or Hall Effect technology.

5. The floor cleaning machine of claim 1, further comprising a right mechanical linkage between the right electrical drive motor and the right rear steering drive wheel, and a left mechanical linkage between the left electrical drive motor and the left rear steering drive wheel.

6. The floor cleaning machine of claim 5, wherein each of the mechanical linkages comprises a belt drive and pulley.

7. The floor cleaning machine of claim 5, wherein each of the mechanical linkages comprises a direct drive mechanism.

8. The floor cleaning machine of claim 1, wherein each rear steering drive wheel is capable of being in the other rear steering drive wheel position after a 180 degree turn.

9. The floor cleaning machine of claim 1, wherein each of the rear steering drive wheels is capable of remaining in a pivot position.

10. The floor cleaning machine of claim 1, further comprising a burnishing machine.

11. A floor cleaning machine, comprising:
an analog joystick;
an electrical power source;
at least one motor controller in electrical communication between the analog joystick and the electrical power source;
a right electrical drive motor in electrical communication with the motor controller and in mechanical communication with a right rear steering drive wheel; and
a left electrical drive motor in electrical communication with the motor controller and in mechanical communication with a left rear steering drive wheel;

right and left potentiometers electrically connected between the joystick and the motor controller, the right and left potentiometers cooperate to control the independent rotational speeds and rotational directions of the right and left steering drive wheels;

wherein the right rear steering drive wheel and the left rear steering drive wheel are not in mechanical communication with each other and rotational speed and rotational direction of each rear steering drive wheel is independent of the other rear steering drive wheel, on a floor to be cleaned;

wherein the analog joystick has a stop position where the motors are a regenerative brake and the analog joystick has any other position where the motors are rotationally mechanically connected to the rear steering drive wheels and;

wherein the analog joystick is spring loaded to the stop position;

wherein each controller comprises a processor electrically connected externally to a corresponding potentiometer and electrically connected internally to a MOSFET driver that in turn is electrically connected internally to a MOSFET bridge circuit that in turn is electrically connected externally to the corresponding electrical drive motor.

12. A method of operating a floor cleaning machine, comprising:
providing an analog joystick, an electrical power source, at least one motor controller in electrical communication between the analog joystick and the electrical power source, a right electrical drive motor in electrical communication with the motor controller that is in mechanical communication with a right rear steering drive wheel, and a left electrical drive motor in electrical communication with the motor controller that is in mechanical communication with a left rear steering drive wheel, wherein the right rear steering drive wheel and the left rear steering drive wheel are not in mechanical communication with each other; and moving the analog joystick from a stop position to a radial direction corresponding to a desired speed and direction so as to independently drive and steer the rear steering drive wheels in a multitude of directions, by way of the motor controllers causing the motors to rotate at a variety of speeds and directions along a floor, thereby providing steering of a floor cleaning machine by only the right and left rear steering drive wheels; and providing at least one potentiometer electrically connected between the analog joystick and the motor controller, the potentiometer controls the independent rotational speeds and rotational directions of the right and left rear steering drive wheels;

wherein the analog joystick has a stop position where the motors are a regenerative brake and the analog joystick has any other position where the motors are rotationally mechanically connected to the rear steering drive wheels;

wherein the analog joystick is spring loaded to the stop position; and wherein the motor controller comprises a processor electrically connected to a potentiometer and electrically connected to a driver that in turn is electrically connected to a bridge circuit that in turn is electrically connected to the right and left electrical drive motors.

13. The method of operating a floor cleaning machine of claim 12, further comprising utilizing at least one cleaning tank to clean the floor.

14. The method of operating a floor cleaning machine of claim 12, wherein an outside turning rear steering drive wheel has a higher speed than an inside turning rear steering drive wheel.

15. The method of operating a floor cleaning machine of claim 12, further comprising providing at least one front caster wheel located below an operator feet resting platform.

16. The method of operating a floor cleaning machine of claim 12, further comprising an operator seat supported above a frame toward the front of the floor cleaning machine.

17. The method of operating a floor cleaning machine of claim 12, further comprising an operator feet resting platform located below an operator seat, toward a front of the floor cleaning machine.

18. The method of operating a floor cleaning machine of claim 12, further comprising signaling one or both of the rear steering drive wheels on the floor cleaning machine to engage in either a forward or reverse direction.

19. The method of operating a floor cleaning machine of claim 12, further comprising a burnishing machine to burnish the floor.

20. The method of operating a floor cleaning machine of claim 12, further comprising providing direct drive mechanisms between the respective right and left electrical drive motors and rear steering drive wheels.

21. A method of operating a floor cleaning machine, comprising:

providing an analog joystick, an electrical power source, at least one motor controller in electrical communication between the analog joystick and the electrical power source, a right electrical drive motor in electrical communication with the motor controller that is in mechanical communication with a right rear steering drive wheel, and a left electrical drive motor in electrical communication with the motor controller that is in mechanical communication with a left rear steering drive wheel, wherein the right rear steering drive wheel and the left rear steering drive wheel are not in mechanical communication with each other; and moving the analog joystick from a stop position to a radial direction corresponding to a desired speed and direction so as to independently drive and steer the rear steering drive wheels in a multitude of directions, by way of the motor controllers causing the motors to rotate at a variety of speeds and directions along a floor, thereby providing steering of a floor cleaning machine by only the right and left rear steering drive wheels;

wherein the analog joystick has a stop position where the motors are a regenerative brake and the analog joystick has any other position where the motors are rotationally mechanically connected to the rear steering drive wheels;

wherein the analog joystick is spring loaded to the stop position; and wherein an inside turning rear steering drive wheel can rotate so as to turn on an axis between the center of the inside turning rear steering drive wheel and the center between the inside turning rear steering drive wheel and the outside turning rear steering drive wheel.

* * * * *